United States Patent [19]

Jensen

[11] Patent Number: 4,695,088
[45] Date of Patent: Sep. 22, 1987

[54] OIL DROP COLLECTOR

[76] Inventor: Otto S. Jensen, 5650 Panorama Dr., Whittier, Calif. 90601

[21] Appl. No.: 891,552

[22] Filed: Aug. 1, 1986

[51] Int. Cl.⁴ ............................................. B62D 25/20
[52] U.S. Cl. ..................................... 296/38; 180/69.1; 184/106
[58] Field of Search ......................... 296/38; 180/69.1; 184/106

[56] References Cited

U.S. PATENT DOCUMENTS

| | | | |
|---|---|---|---|
| 2,732,024 | 1/1956 | Schonwald | 180/69.1 |
| 3,333,652 | 8/1967 | Tribuzi | 180/69.1 |
| 3,354,989 | 11/1967 | Anderson | 184/106 |
| 3,651,884 | 3/1972 | Dorris | 180/69.1 |
| 4,577,713 | 3/1986 | Moon | 180/69.1 |

Primary Examiner—Robert R. Song
Attorney, Agent, or Firm—Francis X. LoJacono

[57] ABSTRACT

An oil collector includes a one-piece molded plastic unit defining a central recess and a quartet of substantially flat outwardly extending flexible arms. Each arm terminates in a rectangular magnet recess. A permanent magnet is disposed and retained within each magnet recess. An absorbent foam plastic cartridge is disposed within the central recess and serves to seal the central recess to a vehicle surface and acts to retain collected oil within the central recess.

4 Claims, 3 Drawing Figures

OIL DROP COLLECTOR

FIELD OF THE INVENTION

This invention relates generally to devices used to intercept and collect fluids leaking from a vehicle or other similar source and particularly to oil drop collectors for use on the oil pan of a vehicle engine or the transmission pan of a vehicle transmission.

BACKGROUND OF THE INVENTION

Through the years internal combustion motor driven vehicles, have despite considerable improvements in their design and construction, tended to exibit a nagging defect in their tendency to leak some of the various lubricants and fluids. Perhaps the most common problem is the leaking of engine lubrication oil from the underside of the engine. Another common leakage problem arises from leakage of automatic transmission lubricating fluids from the underside of the transmission. In most cases such leakage requires rather expensive remedial steps to alleviate. Further, the minor leakage of lubricating fluids is in most cases void of any harmful effect upon the operation of the vehicle. As a result, the dilema confronting the vehicle owner is that on the one hand the leakage of such lubricating fluids has little or no serious effect on the operation of the vehicle and may therefore, with respect to the vehicle's operation, be tolerated by the owner. This is particularly true in view of the substantial costs typically associated with repair. On the other hand however, the effect of the discharged or leaking fluids upon the surroundings of the vehicle is another matter. The fluid drippings accumulate in pools or stains upon the paved surfaces of streets, driveways and garage floors. At its best it presents an unsightly appearance leaving a residue of stains. Beyond this annoyance however, the accumulation of oil deposits on garage floors or other pavement surfaces can present a definite safety hazard in their potential to cause persons to slip or fall, and in some situations cause a fire hazard. All of this combined causes drive vehicle owners to seak a simpler lower cost solution to fluid leakage problems.

As a result, there has arisen a need in the art for the provision of a device which intercepts and collects leaking fluids in order to avoid the production of unsightly oil stains and the creation of the hazards referred to above. This needs has caused practicioners in the art to provide numerous devices directed at solving this problem.

One such device is set forth in U.S. Pat. No. 2,783,848 in which a generally planar member having a concave construction is suspended beneath the leaking area of a motor vehicle by a plurality of springs. The suspension of the oil collecting device is provided by tension in the springs which are attached to the periphery of the oil collecting device at selected portions of the vehicle understructure.

Another such device is set forth in U.S. Pat. No. 3,169,605 in which an oil collection device is shown which provides an accumulation of oil drops when the vehicle is at a stop or low speed and a discharge of the accumulated oil when the vehicle reaches a speed sufficient to provide that air passing through the device carries oil from the device discharging it on the road surface.

Another such device is set forth in U.S. Pat. No. 3,809,175 in which a generally concave pan-like structure is provided with a plurality of outwardly extending flanges each having apertures therein. A plurality of bolts or other fasteners are passed through the flanges and the apertures therein to secure the device to the underside of a vehicle.

Another such device is set forth in U.S. Pat. No. 2,868,329 in which a trough-like structure having a generally concave reservoir and an air passage therein is provided with a mounting flange which cooperates with the oil drain plug of the vehicle to secure the accumulator beneath the vehicle oil drain aperture. When secured to the vehicle, the device is fixed beneath the oil plug drainage aperture and is similar in object and function to the above described device in U.S. Pat. No. 3,169,605 in that the device functions to accumulate oil drippings during vehicle low speed or standstill and to discharge them during higher speed operation.

Another such device is set forth in U.S. Pat. No. 3,329,231 in which a concave pan or trough is provided with a pair of variable length stiffly deformable arms each of which has a plurality of mounting apertures at the ends thereof. The device is secured to the underside of the vehicle engine or transmission by deforming the arms into a configuration whereby the device may be suspended beneath the leak producing area by securing the bent arms to some of the vehicle bolts such as the engine oil pan bolts.

Still another device is set forth in U.S. Pat. No. 3,333,652 in which an extensive apron is provided which in essence covers the entire underside of the vehicle in the region of the engine and transmission. A flexible elastic cord is secured to the periphery of the oil collection device and a plurality of hooks engage the cord and convenient portions of the vehicle understructure to suspend the device beneath the vehicle engine or transmission.

U.S. Pat. No. 2,841,245 sets forth an oil collection device similar in structure to that set forth in U.S. Pat. No. 2,868,329 described above with the primary difference being the use of a snap-in attachment to the vehicle oil discharge orifice The entire device is sealingly attached to the underside of the engine oil pan by the cooperation of the oil pan aperture and a snap-in securing device.

U.S. Pat. No. 2,899,109 sets forth an oil catcher and discharger for a vehicle in which a concave pan-like member defines a flange or lip about its upper periphery and an internal mechanism which is operative to accumulate oil in the absence of vehicle motion and to discharge it when vehicle motion reaches a predetermined speed. The device shown is secured to the underside of the vehicle oil pan by a plurality of elongated magnets secured within the peripheral flange.

As a final example, U.S. Pat. No. 3,269,488 shows an oil sludge collector which is secured to the vehicle oil pan and which provides a low point accumulation reservoir beneath the vehicle oil pan for the purpose of collecting impurities and sludge from the oil. While the device shown is not specifically directed to the problems of oil drop collection in the same sense as the above-described devices, it does provide for the accumulation of the oil sludge and its periodic removal for cleaning.

While the foregoing devices each provide some measure of oil drop collection action, they all suffer from a serious deficiency in that they are generally difficult to secure to the underside of the vehicle at a position in which the leaking fluid will be intercepted. The irregularities of typical vehicle underside components shapes render many of the foregoing devices difficult or even impossible to mount at the location needed. In addition, the foregoing devices once installed are for the most part are difficult to remove and clean. Their remains, therefore, a need in the art for an effective and efficient device for intercepting and collecting undesired vehicle oil droppings which is easily attached to the appropriate point of the vehicle underside and removeable for cleaning and which can accomodate the often varied contours to which attachment is required.

SUMMARY OF THE INVENTION

Accordingly, it is a general object of the present invention to provide an improved fluid leakage collector. It is a more particular object of the present invention to provide an improved fluid leakage collector for use on a motor vehicle which is readily attachable to and removeable from the vehicle for cleaning and servicing. It is a still more particular object of the present invention to provide an improved fluid leakage collector for a motor vehicle which readily accomodates the varying contours of the underside components of the motor vehicle.

In accordance with the invention, there is provided an oil drop collector having a centrally disposed oil accumulation reservoir and means for absorbing and securing accumulated oil therein and a plurality of flexible support arms extending outwardly from the oil accumulation reservoir and terminating in magnetic attachment means whereby the oil collector may be resiliently curved to conform to the varying contours of the vehicle and magentically secure the oil accumulation reservoir tightly thereto.

BRIEF DESCRIPTION OF THE DRAWINGS

The features of the present invention, which are believed to be novel, are set forth with particularity in the appended claims. The invention, together with further objects and advantages thereof, may best be understood by reference to the following description taking in conjunction with the accompanying drawings in the several figures of which like reference numerals identify like elements and in which:

DESCRIPTION OF THE PREFERRED EMBODIMENT

Figure 1:
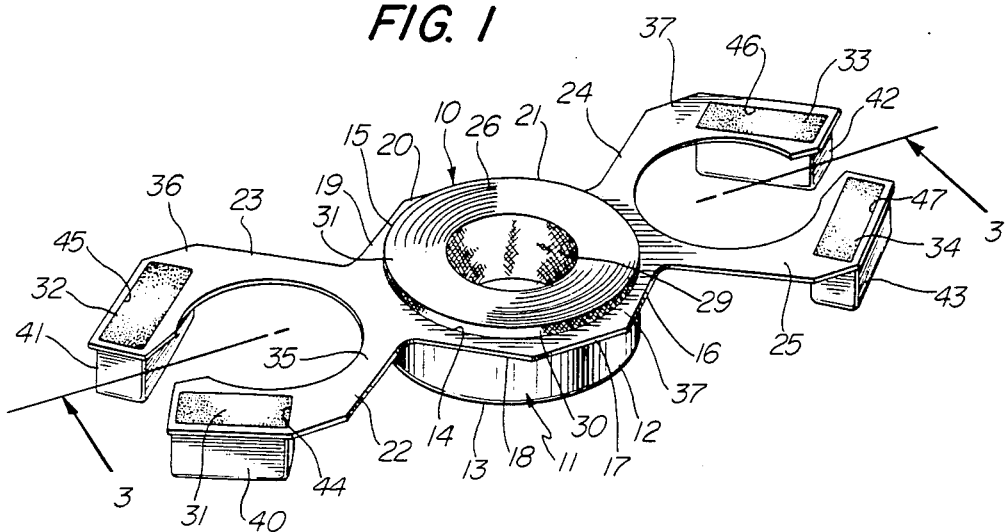
FIG. 1 is a perspective view of an oil drop collector constructed in accordance with the present invention.

FIG. 1 is a perspective view of an oil drop collector constructed in accordance with the present invention generally referenced by numeral 10 and having a center receptacle 11 defined by a clyndrical sidewall 12, and a substantially planar bottom surface 13 (better seen in FIG. 3) and terminating in a circular upper edge 14. As is better understood by simultaneous examination of FIG. 3 in and FIG. 1, center receptacle 11 comprises a clyndrical sidewall 12 and a bottom surface 13 to form a closed cartridge recess 28. A substantially planar surface 27 extends outwardly from upper edge 14 and defines a plurality of facets 17, 18, 19, 20, and 21 facing outwardly from center receptacle 11. The portion of surface 27 extending outwardly from upper edge 14 to facets 17 through 21 defines a rim 15. A first pair of substantially planar flexible arms 22 and 23 extend outwardly from upper edge 14 and are coupled to rim 15 between facets 18 and 19. Flexible arms 22 and 23 further define a pair of magnet recesses 40 and 41 respectively extending downwardly from flexible arms 22 and 23. Magnet recess 40 defines a substantially rectangular closed-end cavity having a rectangular aperture 44 defined in surface 35 of flexible arm 22. Magnet recess 41 defines a rectangular cavity substantially identical to that of magnet recess 40 and terminates at surface 36 of flexible arm 23 in a rectangular aperture 45. A generally rectangular magnet 31 is received within magnet recess 40 and is positioned therein such that its upper surface is substantially flush with surface 35 of flexible arm 22. A second rectangular magnet 32 is similarly received within magnet recess 41 such that its upper surface is substantially flush with surface 36 of flexible arm 23. Magnets 31 and 32 may be secured within magnet recesses 40 and 41 respectively by any number of convenient techniques. For example, magnets 31 and 32 may be simply molded in place during the molding process which produces oil drop collector 10. Alternatively, the oil drop collector may be molded without the magnets and thereafter magnets 31 and 32 may be secured within recesses 40 and 41 respectively usin an appropriate adhesive material. In either event, magnets 31 and 32 are bound within magnet recesses 40 and 41 respectively with sufficient security to fufill their attachment function as described below in greater detail.

A second pair of resiliently flexible arms 24 and 25 extend outwardly from upper edge 14 in a direction substantially opposed to that of flexible arms 22 and 23. Flexible arms 24 and 25 are substantially identical to flexible arms 22 and 23 but are essentially "mirror images" thereof with respect to center receptacle 11. Flexible arms 24 and 25 extend outwardly from center receptacle 11 and rim 15 thereof and join rim 15 between facets 16 and 20. Flexible arm 24 defines a substantially planar surface 37 extending outwardly from its junction with rim 15 and terminates in a box-like magnet recess 42 which in turn defines a rectangular aperture in 46 in surface 37 of flexible arm 24. A rectangular magnet 33 having a construction substantially identical to magnets 31 and 32 is secured within magnet recess 42 such that its upper surface is generally flush with surface 37 of flexible arm 24. Flexible arm 25 defines a substantially planar surface 38 and terminates in a box-like magnet recess 43. Surface 38 defines a rectangular aperture 47 and a magnet 34 having a configuration and construction similar to magnets 31, 32 and 33 is received within magnet recess 43 and secured therein such that its upper surface is substantially flush with surface 38 of flexible arm 25.

An absorbent cartridge 26 defines a generally cylindrical shaped absorbent member having a cylindrical outer surface 30, a planar upper surface 31 and a center aperture 29. Absorbent cartridge 26 is formed of an oil absorbing material such as foam rubber or plastic having sufficient resilience to be readily deformable for reasons set below in greater detail. Absorbent cartridge 26 is snuggly fitted within cartridge recess 28 and is retained therein by the friction created between outer surface 30 of cartridge 26 and the interior wall of cartridge recess 28. In accordance with an important aspect of the present invention discussed below, upper surface 31 and outer surface 30 of cartridge 26 extend beyond surface 27 and upper edge 14.

In use, oil drop collector 10 is positioned at the desired collection point of the vehicle such that upper surface 31 is proximate the source of leaking oil. In its most avantageous use, oil drop collector 10 is positioned on the vehicle underside such that upper surface 31 actually abuts the leaking surface. As described below in greater detail and in accordance with an important aspect of the present invention, cartridge 26 deforms elastically against the vehicle surface to provide a sealing absorbative engagement. Once positioned, oil drop collector 10 is secured in the appropriate position by bending all or several of flexible arms 22 through 25 to magnetically attach the corresponding ones of magnets 31 through 34 respectively in to metal surfaces of the vehicle. In accordance with an important aspect of the present invention, oil drop collector 10 is maintained in its position on the vehicle by the magnetic force between magnets 31 through 34 and the metal portions of the vehicle in which they come in contact making attachment and removal a simple matter. In accordance with a further important aspect of the present invention, flexible arms 22 through 25 are each individually resiliently moveable and independent of the remaining arms, permitting opportune positioning of magnets 31 through 34 notwithstanding the complicated contours typically found on the metal portions on the vehicles underside. The resilience of flexible arms 22 through 25 permits oil drop collector 10 to be used repeatably while the magnetic coupling action of magnets 31 through 34 facilitate the attachment and removal of oil drop collector 10 to and from the vehicle without the use of more difficult fasteners and without the need to disturb the fasteners already in use on the vehicle. In most installations, the resilience of arms 22 through 25 produces a spring force which aids the sealing abutment of surface 31 against the leaking surface of the vehicle.

Absorbent cartridge 26 is, as mentioned, retained within cartridge recess 28 by the friction between outer surface 30 and the cartridge recess. Accordingly, absorbent cartridge 26 may be easily removed for cleaning or replacement. While any number of absorbent cartridge materials may be utilized to perform the oil absorbing function of cartridge 26, it has been found advantageous to fabricate the cartridge from an absorbent foam rubber or foam plastic material which may be easily cleaned and reused. If desired, however, it will be readily apparent to those skilled in the art that absorbent cartridge 26 may be formed of a disposable paper or other pulpy absorbent material without departing from the spirit and scope of the present invention. In either case, one of the important functions of absorbent cartridge 26 is to provide a sealing contact with the leaking surface of the vehicle and to absorb and retain the collected oil within cartrdige recess 28. The use of absorbent cartridge 26 within cartridge recess 28 also permits substantially greater amounts of leaking fluid to be collected and retained within cartridge recess 28 without spilling fluid when the vehicle is in motion.

Figure 2:
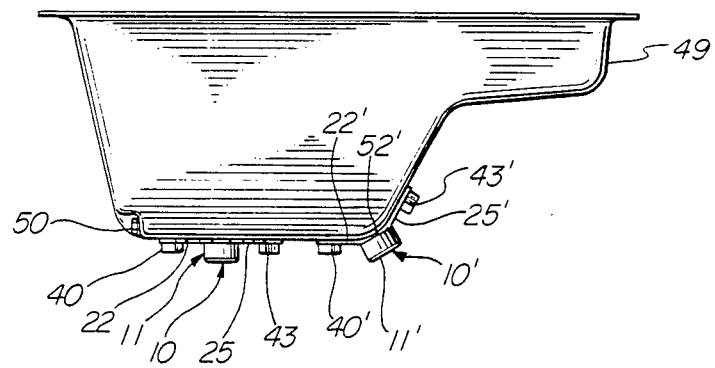
FIG. 2 is a side view of a typical motor vehicle oil pan showing alternate exemplary positions of attachment of the present invention oil drop collector.

FIG. 2 sets forth a typical application of the present invention oil drop collector in which an oil pan 49 is illustrative of an automobile engine oil pan. It should be understood however that oil pan 49 is representative of other types of leaking surface of metal reservoir having varied contours or silhouettes. Oil pan 49 should also be understood to contain a reservoir of fluid and in the example shown in FIG. 2 has developed fluid leaks 51 and 52 at the location showns. Oil pan 49 further defines a drain plug 50 which in accordance with commonly utilized fabrication techniques permits draining and replacement of the internal fluid of oil pan 49. Oil drop collector 10 is shown positioned such that center receptacle 11 is substantially centered with respect to leak 51. As can be seen, the surrounding surface of leak 51 is substantially flat and therefore arms 22 and 25 as well as arms 23 and 24 (not visible) extend outwardly along the flat surface of oil pan 49 surrounding leak 51. Magnets 31 through 34 attach to the surface of oil pan 49 and secure oil drop collector 10 against oil pan 49. As mentioned, oil drop collector 10 functions optimally when absorbent cartridge 26 is compressed against the oil pan surface.

While the circumstance shown for leak 51 is optimum in that the surrounding surface is flat it also represents a unusual circumstance. More typically, vehicle oil leaks are encountered in or about portions of the vehicle having varied and curved contours. Leak 52 is a more typical example of an oil leak and permits the utilization of an important advantage of the present invention oil drop collection. In relation to leak 52 a second oil drop collector 10' of identical construction to oil drop collector 10 is utilized. It should be understood that each of the component numbers of oil drop collector 10' are simply the numbers of the corresponding components of oil drop collector 10 with a prime added. For example, receptacle 11' corresponds to receptacle 11 and flexible arm 25' to flexible arm 25 and so on. Accordingly, oil drop collector 10' is positioned with respect to leak 52 such that center receptacle 11' is substantially centered with respect to leak 52. Once positioned, flexible arms 24' and 25' are bent toward surface of oil pan 49 to bring magnets 33' and 34' into magnetic attachment with the oil pan. Similarly, flexible arms 22' and 23' are bent to bring magnets 31' and 32' into contact with the surface oil pan 49 and attached magnetically. As will be apparent in FIG. 2, oil drop collector 10' has due to the resilience of flexible arms 22' through 25' conformed to the curved surface of oil pan 49 in a simple but effective attachment.

It should be apparent to those skilled in the art that while two locations and configurations of the present invention oil drop collector have been shown, these positions and orientations are merely for illustration and the present invention oil drop collector may readily conform to any number of vehicle configurations. Further, it will also be apparent that while a cylindrically shaped center receptacle 11 and cartridge recess 28 and a correspondingly cylindrical absorbent cartridge 26 have been disclosed in the embodiments shown, it will be apparent to those skilled in the art that any number of central recess and cartridge configurations may be utilized without departing from the spirt and scope of the present invention.

Figure 3:
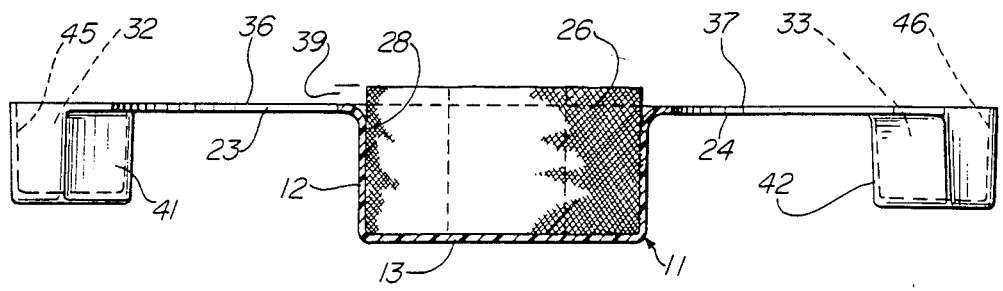
FIG. 3 is a section view of the present invention oil drop collector taken along section lines 3—3 of FIG. 1.

FIG. 3 is a section view of the present invention oil drop collector 10 taken along section lines 3—3 in FIG. 1. Center receptacle 11 defines a cylindrical side wall 12 and a bottom 13. Cartridge recess 28 forms a closed upwardly facing recess receiving absorbent cartridge 26. Flexible arms 23 and 24 extend outwardly from sidewall 12 of center receptacle 11 and terminate in magnet recesses 41 and 42 respectively. Flexible arms 23 and 24 define upper surfaces 36 and 37 respectively. As is more clearly shown in FIG. 3 and in accordance with an important aspect of the present invention, absorbent cartridge 26 extends beyond surfaces 36 and 37 of flexible arms 23 and 24 for a predetermined distance 39. As discussed above, this extension of absorbent cartridge 26 above the surrounding surfaces and receptacle 11 permits absorbent cartridge 26 to be sealingly engaged with the vehicle surface such that leaking oil is directly collected within receptacle 11 thereby minimizing the likelihood that such oil will escape the oil drop collector.

While virtually any resilient material may be used, it has been found advantageous to construct the present invention oil drop collector as a single molded plastic unit. As a result, in its preferred embodiment, magnet recesses 40 through 43, flexible arms 22 through 25, rim 15, and center receptacle 11 comprise a single integral molded plastic unit. As mentioned, magnets 31 through 34 may be secured within magnet recesses 40 through 43 during the molding process or separately bonded therein through the use of an appropriate adhesive material. In either event, cartridge 26 is by design a separate component which is removable from the oil drop collector to permit the above described cleaning and servicing.

What has been shown is an inexpensive to manufacture and easy to use oil drop collector for use with a vehicle which permits ready attachment to and removal from a vehicle underside and which accomodates a variety of vehicle underside contours without modification of the oil drop collector. While the application shown for the present invention oil drop collector has been its use upon a motor vehicle, it will be apparent to those skilled in the art that the present invention oil drop collector may be utilized in a variety of situations both in connection with and apart from vehicles in virtually any circumstance in which a fluid is leaking from a metallic object. For example, the present invention oil drop collector may be used, due to its novel construction, in attachment to metal pipes, tanks, reservoirs or valves, and the like in any number of fluid systems.

While particular embodiments of the present invention have been shown and described, it will be obvious to those skilled in the art that other changes and modifications may be made thereto without departing from the invention in its broader aspects. Therefore, the aim in the appended claims is to cover all such changes and modifications as fall within the true spirit and scope of the present invention.

I claim:

1. An oil drop collector comprising:
   an oil collection reservoir defining an oil collection recess;
   an absorbent cartridge configured to be received within said oil collection recess;
   wherein said absorbent cartridge extends beyond said oil collection recess by a predetermined distance;
   a plurality of resilient flexible arms extending outwardly from said reservoir;
   wherein said oil collection reservoir and said plurality of resilient flexible arms form a one-piece molded unit;
   a plurality of magnets secured to each of said resilient flexible arms in said plurality of resilient flexible arms; and
   wherein said resilient flexible arms each terminate in a recessed cavity and wherein said magnets in said plurality of magnets are received within said recessed cavities and adhesively secured therein.

2. An oil drop collector as set forth in claim 1 wherein said resilient flexible arms each define a planar portion which possesses a resilient spring character tending to urge said resilient flexible arms to return to a flat configuration.

3. An oil drop collector as set forth in claim 1 wherein said resilient flexible arms each define a planar portion which possesses a resilient spring character tending to urge said resilient flexible arms to return to a flat configuration.

4. An oil drop collector comprising:
   a one-piece molded plastic member defining a cylindrical recessed reservoir, and first, second, third and fourth substantially planar flexible arms extending outwardly therefrom, each of said arms defining a recess;
   first, second, third and fourth magnets positioned within each of said recesses of said first, second, third and fourth arms; and
   an annular foam plastic oil absorbing member sized to be snuggly received within said cylindrical recessed reservoir.

* * * * *